United States Patent
Kornmann et al.

(10) Patent No.: US 9,545,565 B1
(45) Date of Patent: Jan. 17, 2017

(54) REGULATING AND SCORING PLAYER INTERACTIONS WITHIN A VIRTUAL WORLD ASSOCIATED WITH A LOCATION-BASED PARALLEL REALITY GAME

(71) Applicant: Niantic, Inc., San Francisco, CA (US)

(72) Inventors: David Kornmann, Tucson, AZ (US); Alexander Vladimirov, San Francisco, CA (US); Chris Hibbert, Mountain View, CA (US); Jim Wang, Brisbane, CA (US); Charles Spirakis, Los Altos, CA (US); John Hanke, Piedmont, CA (US)

(73) Assignee: Niantic, Inc., San Francisco, CA (US)

( * ) Notice: Subject to any disclaimer, the term of this patent is extended or adjusted under 35 U.S.C. 154(b) by 340 days.

(21) Appl. No.: 14/068,704

(22) Filed: Oct. 31, 2013

(51) Int. Cl.
*A63F 13/00* (2014.01)

(52) U.S. Cl.
CPC ..................... *A63F 13/00* (2013.01)

(58) Field of Classification Search
CPC ....................................... A63F 13/00
USPC .............................................. 463/9
See application file for complete search history.

(56) References Cited

U.S. PATENT DOCUMENTS

| | | |
|---|---|---|
| 6,530,841 B2 | 3/2003 | Bull et al. |
| 6,811,084 B2 | 11/2004 | Tatsuta et al. |
| 7,275,994 B2 | 10/2007 | Eck et al. |
| 7,435,179 B1 | 10/2008 | Ford |
| 7,491,123 B2 | 2/2009 | Smith |
| 7,564,469 B2 | 7/2009 | Cohen |
| 7,946,919 B2 | 5/2011 | Piccionelli |
| 7,970,749 B2 | 6/2011 | Uhlir et al. |
| 8,002,617 B1 | 8/2011 | Uskela et al. |
| 8,070,608 B2 | 12/2011 | Uhlir |
| 8,108,459 B1 | 1/2012 | Hoffman et al. |
| 8,190,733 B1 | 5/2012 | Hoffman et al. |
| 8,267,794 B2 | 9/2012 | Van Luchene |
| 8,287,383 B1 | 10/2012 | Etter et al. |
| 8,291,016 B1 | 10/2012 | Whitney et al. |
| 8,308,568 B2 | 11/2012 | Amaitis et al. |
| 8,366,446 B2 | 2/2013 | Kreiner et al. |

(Continued)

FOREIGN PATENT DOCUMENTS

| | | |
|---|---|---|
| EP | 1574238 | 9/2005 |
| EP | 2101889 | 9/2009 |

(Continued)

OTHER PUBLICATIONS

Matyas, "Playful Geospatial Data Acquisition by Location-Based Gaming Communities", The International Journal of Virtual Reality, vol. 6, No. 3, pp. 1-10.

(Continued)

*Primary Examiner* — Corbett B Coburn
(74) *Attorney, Agent, or Firm* — Fenwick & West LLP

(57) ABSTRACT

A parallel reality game has a virtual world that parallels at least a portion of the real world. A captured region is identified within the virtual world that is associated with a team within the parallel reality game. A geographic region is identified within the real world corresponding to the captured region within the virtual world. Data associated with population density for at least a portion of the geographic region is accessed. A score is assigned for the captured region based on the population density.

20 Claims, 10 Drawing Sheets

(56) References Cited

U.S. PATENT DOCUMENTS

| | | | |
|---|---|---|---|
| 8,668,592 B2* | 3/2014 | Watkins, Jr. | A63F 13/12 463/1 |
| 8,761,800 B2* | 6/2014 | Kuwahara | A63F 13/12 455/456.3 |
| 2001/0009867 A1 | 7/2001 | Sakaguchi et al. | |
| 2002/0090985 A1 | 7/2002 | Tochner et al. | |
| 2003/0036428 A1 | 2/2003 | Aasland | |
| 2003/0224855 A1 | 12/2003 | Cunningham | |
| 2004/0029625 A1 | 2/2004 | Annunziata | |
| 2004/0058732 A1 | 3/2004 | Piccionelli | |
| 2004/0255268 A1 | 12/2004 | Meijer et al. | |
| 2005/0049022 A1 | 3/2005 | Mullen | |
| 2006/0105838 A1 | 5/2006 | Mullen | |
| 2006/0258420 A1 | 11/2006 | Mullen | |
| 2006/0281553 A1 | 12/2006 | Hawkins et al. | |
| 2006/0284789 A1 | 12/2006 | Mullen | |
| 2006/0287026 A1 | 12/2006 | Mullen | |
| 2007/0021166 A1 | 1/2007 | Mattila | |
| 2007/0060408 A1 | 3/2007 | Schultz et al. | |
| 2007/0104348 A1 | 5/2007 | Cohen | |
| 2007/0149284 A1 | 6/2007 | Plavetich et al. | |
| 2007/0281765 A1 | 12/2007 | Mullen | |
| 2007/0281766 A1 | 12/2007 | Mullen | |
| 2008/0015018 A1 | 1/2008 | Mullen | |
| 2008/0015024 A1 | 1/2008 | Mullen | |
| 2008/0146338 A1 | 6/2008 | Bernard et al. | |
| 2009/0005140 A1 | 1/2009 | Rose et al. | |
| 2009/0017913 A1 | 1/2009 | Bell et al. | |
| 2009/0024986 A1 | 1/2009 | Meijer et al. | |
| 2009/0281851 A1 | 11/2009 | Newton et al. | |
| 2010/0287011 A1 | 11/2010 | Muchkaev | |
| 2010/0331089 A1 | 12/2010 | Priebatsch et al. | |
| 2011/0004658 A1 | 1/2011 | Chesley et al. | |
| 2011/0081973 A1 | 4/2011 | Hall | |
| 2011/0319148 A1 | 12/2011 | Kinnebrew et al. | |
| 2012/0040745 A1 | 2/2012 | Auterio et al. | |
| 2012/0052953 A1 | 3/2012 | Annambhotla et al. | |
| 2012/0094770 A1 | 4/2012 | Hall | |
| 2012/0157210 A1 | 6/2012 | Hall | |
| 2012/0185892 A1 | 7/2012 | Camplejohn et al. | |
| 2012/0190452 A1 | 7/2012 | Weston et al. | |
| 2012/0226627 A1 | 9/2012 | Yang | |
| 2012/0231887 A1 | 9/2012 | Lee et al. | |
| 2012/0233258 A1 | 9/2012 | Vijayaraghavan et al. | |
| 2012/0244929 A1* | 9/2012 | Oakes | G07F 17/32 463/22 |
| 2012/0246104 A1 | 9/2012 | Di Sciullo et al. | |
| 2012/0315992 A1 | 12/2012 | Gerson et al. | |
| 2013/0004932 A1 | 1/2013 | Mahajan et al. | |
| 2013/0005475 A1 | 1/2013 | Mahajan et al. | |
| 2013/0005480 A1 | 1/2013 | Bethke et al. | |
| 2013/0072308 A1 | 3/2013 | Peck et al. | |
| 2013/0117326 A1 | 5/2013 | De Smet et al. | |
| 2013/0178257 A1 | 7/2013 | Langseth | |
| 2013/0244776 A1* | 9/2013 | Everly | A63F 13/00 463/31 |

FOREIGN PATENT DOCUMENTS

| | | |
|---|---|---|
| EP | 2393056 | 12/2011 |
| EP | 2416289 | 2/2012 |
| WO | WO 02/062436 | 8/2002 |

OTHER PUBLICATIONS

Klout, Inc., "Klout Score," 2015, 4 pages, [online] [retrieved on Apr. 1, 2013] Retrieved from the internet <URL:www.Klout.com/corp/klout_score>.

Empire Kred Pty Ltd., "About Empire Avenue," 2009-2016, 1 page, Can be retrieved at <URL:http://www.empire.kred/about/>.

* cited by examiner

REGULATING AND SCORING PLAYER INTERACTIONS WITHIN A VIRTUAL WORLD ASSOCIATED WITH A LOCATION-BASED PARALLEL REALITY GAME

FIELD

The present disclosure relates generally to location-based gaming, and more particularly, to a system and method for regulating and scoring player interactions within the virtual world associated with a location-based parallel reality game.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. However, such gaming systems typically do not include a virtual world that parallels the real world and that acts as a virtual game environment in which many players can interact and perform various game objectives in the parallel virtual world by navigating and performing actions in the real world.

A parallel reality game providing a shared virtual world that parallels at least a portion of the real world allows players to interact in the virtual world by navigating the real world. However, without game rules associated with regulating and/or scoring player interactions within the virtual world, the overall game experience may be significantly impacted.

SUMMARY

Aspects and advantages of the embodiments will be set forth in part in the following description, or may be obvious from the description, or may be learned through practice of the embodiments.

In one aspect, the present subject matter is directed to a computer-implemented method for regulating player interactions within a location-based parallel reality game. The parallel reality game may have a virtual world that parallels at least a portion of the real world. The method may include receiving, with one or more computing devices, an interaction request from a player of the parallel reality game. The interaction request may be associated with using a virtual item to interact with a virtual element located within the virtual world. The method may also include identifying a power level associated with the virtual item and identifying a predetermined use limit associated with the power level. The predetermined use limit may correspond to an allowable number of virtual items that can be used by the player to interact with the virtual element at each power level. In addition, the method may include determining whether the virtual item can be used by the player to interact with the virtual element based on the predetermined use limit.

In another aspect, the present subject matter is directed to a computer-implemented method for regulating player interactions within a location-based parallel reality game. The parallel reality game may have a virtual world that parallels at least a portion of the real world. The method may include receiving, with one or more computing devices, an interaction request from a player of the parallel reality game. The interaction request may be associated with using a virtual item to link a first virtual element located within the virtual world to a second virtual element within the virtual world. The method may also include verifying that the player's location within the virtual world is proximal to the location of the first virtual element, verifying that the first and second virtual elements are positioned within a given distance from one another within the virtual world and verifying that the virtual item can be used to link the first and second virtual elements.

In a further aspect, the present subject matter is directed to a computer-implemented method for scoring player interactions within a location-based parallel reality game. The parallel reality game may have a virtual world that parallels at least a portion of the real world. The method may include identifying a captured region within the virtual world. The captured region may be associated with a team within the parallel reality game. The method may also include identifying a geographic region within the real world corresponding to the captured region within the virtual world, accessing data associated with population density for at least a portion of the geographic region and assigning a score for the captured region based on the population density.

Other exemplary implementations of the present disclosure are directed to systems, apparatus, non-transitory computer-readable media, devices, and user interfaces for regulating and/or scoring player interactions within a virtual world associated with a location-based parallel reality game.

These and other features, aspects and advantages of the present subject matter will become better understood with reference to the following description and appended claims. The accompanying drawings, which are incorporated in and constitute a part of this specification, illustrate embodiments and, together with the description, serve to explain the principles of the present subject matter.

BRIEF DESCRIPTION OF THE DRAWINGS

A detailed discussion of the embodiments directed to one of ordinary skill in the art is set forth in the specification, which makes reference to the appended figures, in which.

DETAILED DESCRIPTION

Figure 1:
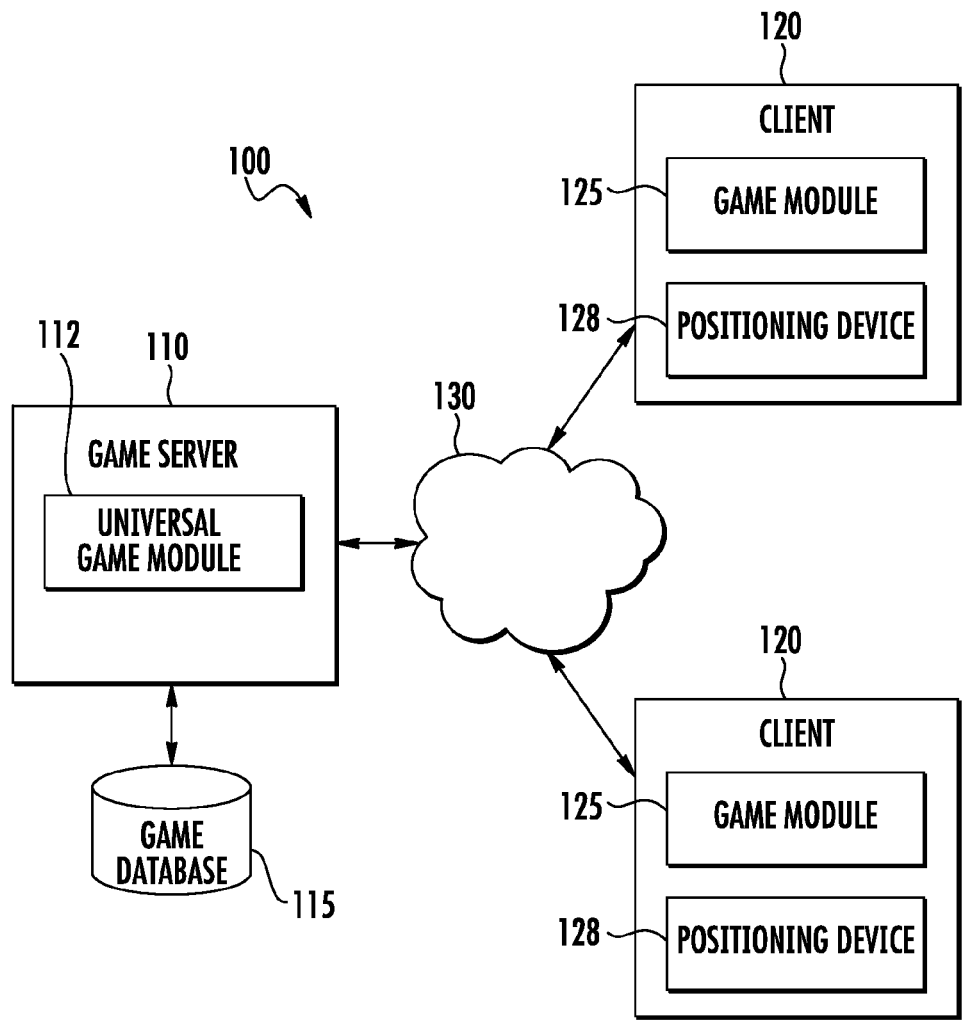
FIG. 1 illustrates one embodiment of a computer-based system for implementing a location-based parallel reality game in accordance with aspects of the present subject matter.

Reference now will be made in detail to embodiments of the present subject matter, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter covers such modifications and variations as come within the scope of the appended claims and their equivalents.

Overview

Generally, the present subject matter is directed to computer-implemented methods and systems for regulating and/or scoring player interactions within a location-based parallel reality game. Specifically, the game may have a virtual world that parallels at least a portion of the real world, with virtual elements, such as virtual portals, virtual items, virtual energy, and other virtual elements, being dispersed throughout the virtual world. In several embodiments, players may interact with the virtual elements to achieve game objectives or to otherwise participate within the game. For instance, players may able to capture or otherwise claim ownership of virtual elements by interacting with such elements within the virtual world. Players may also be able to link virtual elements together to capture or claim ownership of one or more regions within the virtual world. Additionally, in several embodiments, the game may include two or more factions or teams, with each player being associated with one of the teams. In such embodiments, game scores may be assigned to each team based upon the interactions of team members with the virtual elements contained within the virtual world. For example, scores may be assigned to each region within the virtual world that is captured by a member(s) of a particular team, with the team's total game score being an aggregation of the individual scores assigned to each captured region.

In several embodiments, the location-based parallel reality game may be hosted by a game server having a player gaming area that includes a virtual environment with a geography that parallels at least a portion of the real world geography. Players can navigate a virtual space in the virtual world by navigating a corresponding geographic space in the real world. In particular, players can navigate a range of coordinates defining a virtual space in the virtual world by navigating a range of geographic coordinates in the real world. In doing so, the positions of the players can be monitored or tracked using, for instance, a positioning system (e.g. a GPS system) associated with a player's mobile computing device (e.g. cell phone, smartphone, gaming device, or other device). As players move about in the real world, player position information can be provided to the game server over a network. The game server can update player positions in the parallel virtual world to correspond with the player positions in the real world.

As indicated above, the location-based parallel reality game may include virtual elements that players can interact with during the course of the game. To interact with a virtual element, a player may need to travel to the corresponding location of the virtual element in the real world and perform any necessary interactions within the game to capture, collect and/or use the virtual element. For instance, virtual elements, such as virtual portals, may be dispersed throughout the virtual world that can be captured by a member(s) of a team by interacting with the portals using one or more additional virtual elements, such as one or more virtual items (e.g., a virtual resonator(s)). Specifically, in several embodiments, a player of the game may be able to travel to the real-world location corresponding the location of one of the virtual portals within the virtual world and subsequently deploy one or more virtual items at and/or adjacent to the virtual portal to capture such portal for his/her team. In doing so, the player may be required to use a specific amount of virtual items (e.g., eight virtual items) to capture the virtual portal. By capturing a virtual portal within the virtual world, a player may be able to collect additional virtual items (e.g., virtual resonators, link keys, etc.), gain experience points or otherwise advance within the game.

Additionally, in several embodiments, each virtual item capable of being used to capture a virtual portal may have a specific power level, which may remain constant or may be upgraded or enhanced during gameplay. In such embodiments, when multiple virtual items are used to capture a specific virtual portal, the resulting captured portal may be assigned a power level based upon the individual power levels of the virtual items used in capturing the portal. For instance, in several embodiments, virtual items may have one of eight different power levels, with the power levels ranging from the lowest level (Level 1) to the highest level (Level 8). Thus, when multiple low level virtual items are used to capture a virtual portal (e.g., multiple Level 1 and/or Level 2 items), the resulting captured portal may have a relatively low power level. However, when multiple high level virtual items are used to capture a virtual portal (e.g., multiple Level 7 and/or Level 8 items), the resulting captured portal may have a relatively high power level. The power level associated with each captured portal may impact the gaming characteristics of the portal, such as the growth rate or linking range of the portal and/or the ability of the portal to withstand attacks (e.g., attempts to hack the portal) from members of opposing teams.

According to one aspect of the present subject matter, players may be limited in the amount of virtual items that can be used to capture a given virtual element based upon the power level associated with each virtual item. Specifically, in several embodiments, the number of virtual items that each player may deploy to capture a virtual element may decrease with increasing power levels. Such use limits on the number of virtual items that can be deployed may generally be implemented to incentivize collaborative play within the game while at the same time providing a meaningful gaming experience to individual players. For instance, an individual player may be allowed to deploy enough low level virtual items (e.g., eight Level 1 items) to enable the player to capture a virtual portal by himself/herself. However, to capture a virtual portal having a high power level, multiple players from the same team may be required, with each player deploying one or more higher level virtual items in order to capture the portal.

In addition to capturing virtual elements, players may also be able to link captured elements together. For instance, in several embodiments, virtual portals that have been captured by members of a team may be linked together to define a captured region within the virtual world that is owned or controlled by such team. As will be described below, a pair of virtual portals may be linked when several predetermined conditions are satisfied. For example, it may be required that player seeking to link the portals is both located proximate to one of the virtual portals and possesses a virtual linking item (e.g., a link key) that allows the two portals to be linked. Additionally, it may be required that the player be a member of the team that controls the virtual portals being linked and that the portals be located within a given distance of one another within the virtual world.

As virtual portals are captured and linked together by members of a specific team, the virtual space within the virtual world that is encompassed by the linked portals may be captured or claimed by such team. The captured regions associated with each team may then be utilized to assign a game score to each team. For instance, in several embodiments, geographic regions may be identified within the real-world that correspond to the virtual spaces defined by the captured regions within the virtual world. In such embodiments, to assign a score to each captured region, the total area of the corresponding geographic region within the real-world may be multiplied by the population density associated with such geographic region. The individual scores for each captured region associated with a team may then be aggregated to determine the team's total game score. Each team's game score may then be published to players of the game (e.g., in a leaderboard-type display format).

Embodiments of Location-Based Parallel Reality Gaming Systems

Embodiments of computer-implemented location-based gaming systems according to aspects of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods for regulating and/or scoring player interactions within the game can be implemented using a single computing device or across multiple computing devices.

FIG. 1 illustrates one embodiment of a computer-implemented location-based gaming system 100 configured in accordance with aspects of the present subject matter. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
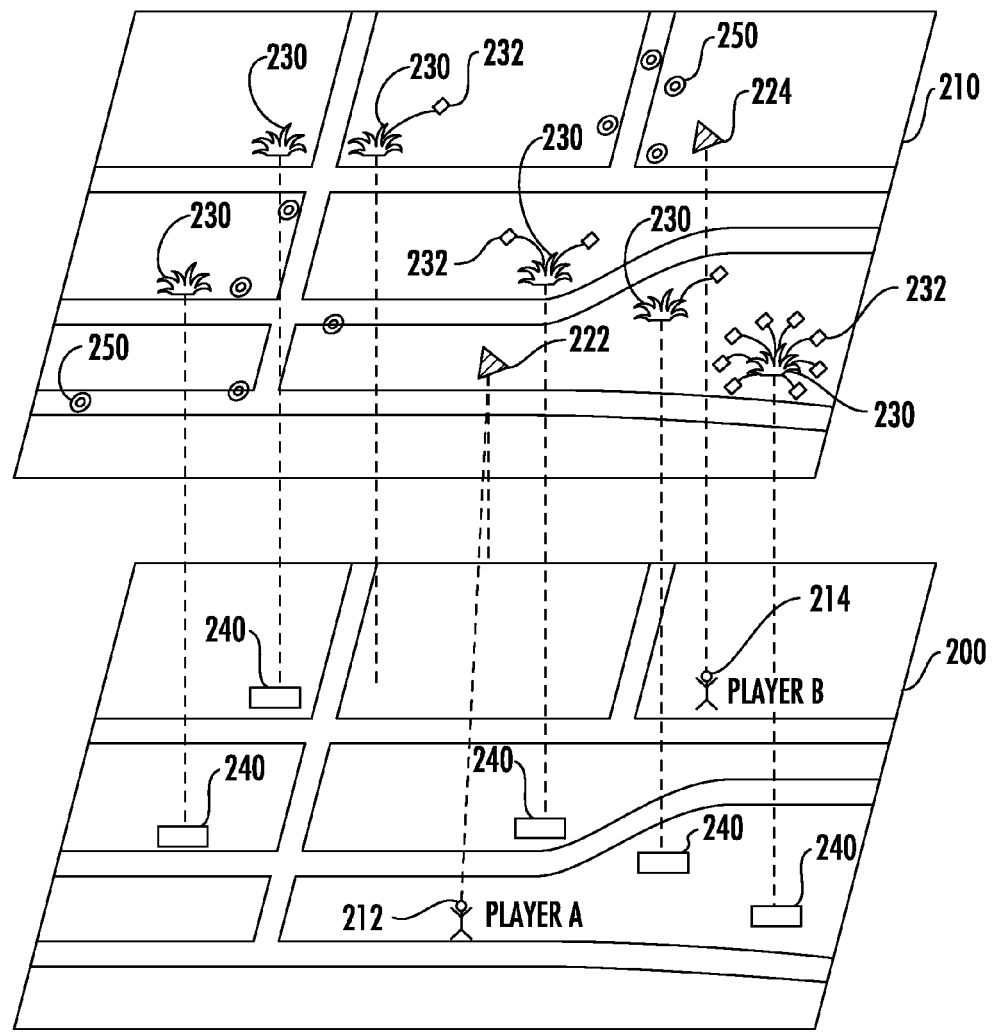
FIG. 2 illustrates an example representation of a virtual world having a geography that parallels the real world.

FIG. 2 illustrates an example conceptual diagram of a virtual world 210 that parallels the real world 200 that can act as the game board for all players of a location-based parallel reality game according to aspects of the present subject matter. As shown, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based parallel reality game can include a plurality of game objectives requiring players to travel to and/or interact with various virtual elements scattered at various virtual locations in the virtual world. A player can travel to these virtual locations by traveling to the corresponding location of the virtual elements in the real world. For instance, a positioning system may continuously track the position of the player such that as the player continuously navigates the real world, the player also continuously navigates the parallel virtual world. The player can then interact with various virtual elements at the specific location to achieve or perform one or more game objectives.

For example, referring to FIG. 2, a game objective can require players to capture or otherwise claim ownership of virtual elements (e.g., virtual portals 230) located at various virtual locations in the virtual world 210. These virtual elements can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements, a player may be required to travel to each landmark or geographic location 240 linked to the virtual elements in the real world and perform any necessary interactions with the elements in the virtual world 210. For example, player A of FIG. 2 may have to travel to a landmark 240 in the real world 200 in order to interact with or capture a virtual portal 230 linked with that particular landmark 240. The interaction with the virtual portal 230 may require action in the real world, such as taking a photograph and/or verifying, obtaining, or capturing other information about the landmark or object 240 associated with the virtual portal 230.

In addition, game objectives may require that players use one or more virtual elements that are collected by the players within the game. For instance, players may have to travel the virtual world 210 seeking virtual items 232 (e.g. weapons or other virtual items, such as resonators) that can be useful for completing game objectives. These virtual items 232 can be found or collected by traveling to different locations in the real world or by completing various actions in either the virtual world or the real world. In the example shown in FIG. 2, a player may use one or more virtual items 232 to capture one or more of the virtual portals 230. In particular, a player can deploy virtual items 232 at locations in the virtual world 210 proximate the virtual portals 230. As will be described below, deploying one or more virtual items 232 proximate a virtual portal 230 can result in the capture of the portal 230 for the particular player or for the team or faction associated with the particular player.

Moreover, in several embodiments, a player may have to gather other types of virtual elements (e.g., virtual energy 250) as part of the game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power other virtual elements and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of virtual elements, such as virtual portals 230 located within the virtual world 210. In this manner, the location-based game can intrinsically be a social game that encourages cooperation among players within the game. Players from opposing teams can work against each other while playing the game. A player can use virtual elements to attack or impede progress of players on opposing teams.

The game can have various features to enhance and encourage game play. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual elements that can be used to complete game objectives within the game. Those of ordinary skill in the art, using the disclosures provided herein, should understand that various other game features can be included with the location-based parallel reality game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal gaming module 112 that controls aspects of the game for all players and receives and processes each player's input in the game. On the client-side, each client 120 can include a gaming module 125 that operates as a gaming application so as to provide a player with an interface to the system 100. The game server 110 transmits game data over the network 130 to the client 120 for use by the gaming module 125 at the client 120 to provide local versions (e.g. portions of the virtual world specific to player locations) of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include a processor and a memory. The memory can store instructions which cause the processor to perform operations. The game server 110 can include or can be in communication with a game database 115. The game database 115 stores game data used in the game to be served or provided to the client(s) 120 over the network 130.

The game data stored in the game database 115 can include: (1) data associated with the virtual world in the game (e.g. imagery data used to render the virtual world on a display device, geographic coordinates of locations in the virtual world, etc.); (2) data associated with players of the game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements within the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, team/faction scores etc.); (7) data associated with player actions/input (e.g. current player positions, past player positions, player moves, player input, player queries, player communications, etc.); and (8) any other data used, related to, or obtained during implementation of the location-based parallel reality game. The game data stored in the game database 115 can be populated either offline or in real time by system administrators and/or by data received from users/players of the system 100, such as from one or more clients 120 over the network 130.

The game server 110 can be configured to receive requests for game data from one or more clients 120 (for instance, via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input, player location, and other updates to the game server 110, which the game server 110 uses to update game data in the game database 115 to reflect any and all changed conditions for the game.

As illustrated, the game server 110 can include a universal game module 112. The universal game module 112 hosts the game for all players and acts as the authoritative source for the current status of the game for all players. The universal game module 112 receives game data from clients 120 (e.g. player input, player position, player actions, player status, landmark information, etc.) and incorporates the game data received into the overall location-based game for all players of the game. The universal game module 112 can also manage the delivery of game data to the clients 120 over the network 130.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any portable computing device that can be used by a player to interact with the gaming system 100. For instance, a client 120 can be a wireless device, a personal digital assistant (PDA), portable gaming device, cellular phone, smart phone, tablet, navigation system, handheld GPS system or other such device. In short, a client 120 can be any computer-device or system that can execute a gaming module 125 to allow a player to interact with the game system 100.

The client 120 can include a processor and a memory. The memory can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130.

The gaming module 125 executed by the client 120 provides an interface between a player and the location-based parallel reality game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based parallel reality game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world based on the actual position of the player in the real world. In particular, the location of the player in the virtual world can correspond to the location of the player in the real world. The gaming module 125 can provide player position information to the game server 110 over the network 130 such that the universal gaming module 112 keeps track of all player positions throughout the game.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, JSON, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Game Interface

Figure 3:
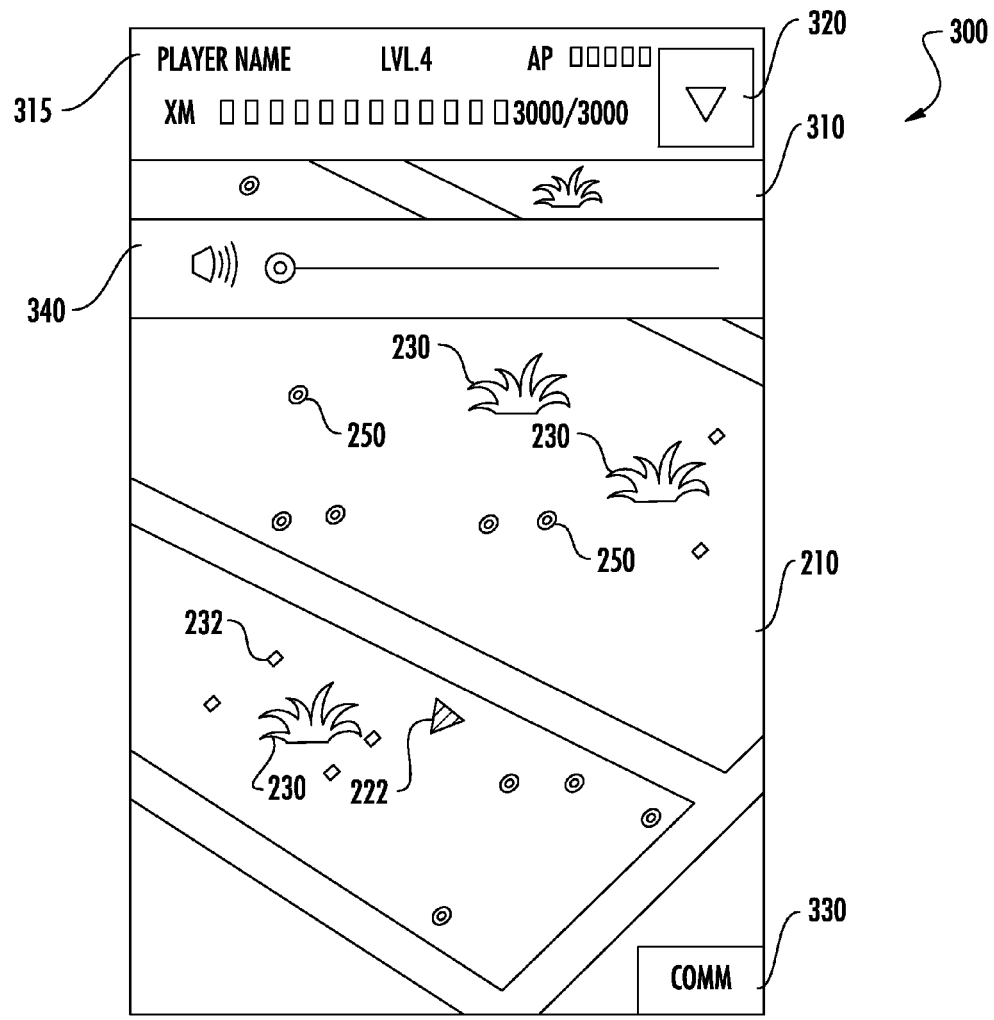
FIG. 3 illustrates one embodiment of a game interface for a location-based parallel reality game in accordance with aspects of the present subject matter.

FIG. 3 illustrates one embodiment of a game interface 300 that can be presented on a display of a client 120 as part of the interface between a player and the gaming system 100. The game interface 300 includes a display window 310 that can be used to display the virtual world 210 and various other aspects of the game, such as the player position 222 and the locations of virtual elements within the virtual world 210, such as virtual portals 230, virtual items 232 and virtual energy 250. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the game.

According to aspects of the present disclosure, a player can interact with the location-based parallel reality game by simply carrying a client device around in the real world. For instance, a player can play the game by simply accessing an application associated with the location based game on a smartphone and moving about in the real world with the smartphone. In this regard, it is not necessary for the player to continuously view a visual representation of the virtual world on a display screen in order to play the game. As a result, the user interface 300 can include a plurality of non-visual elements that allow a user to interact with the game. For instance, the game interface can provide audible notifications to the player when the player is approaching a virtual element in the game or when an important event happens in the game. A player can control these audible notifications with audio control 340. Different types of audible notifications can be provided to the user depending on the type of virtual element or event. The audible notification can increase or decrease in frequency or volume depending on a player's proximity to a virtual element. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Figure 4:
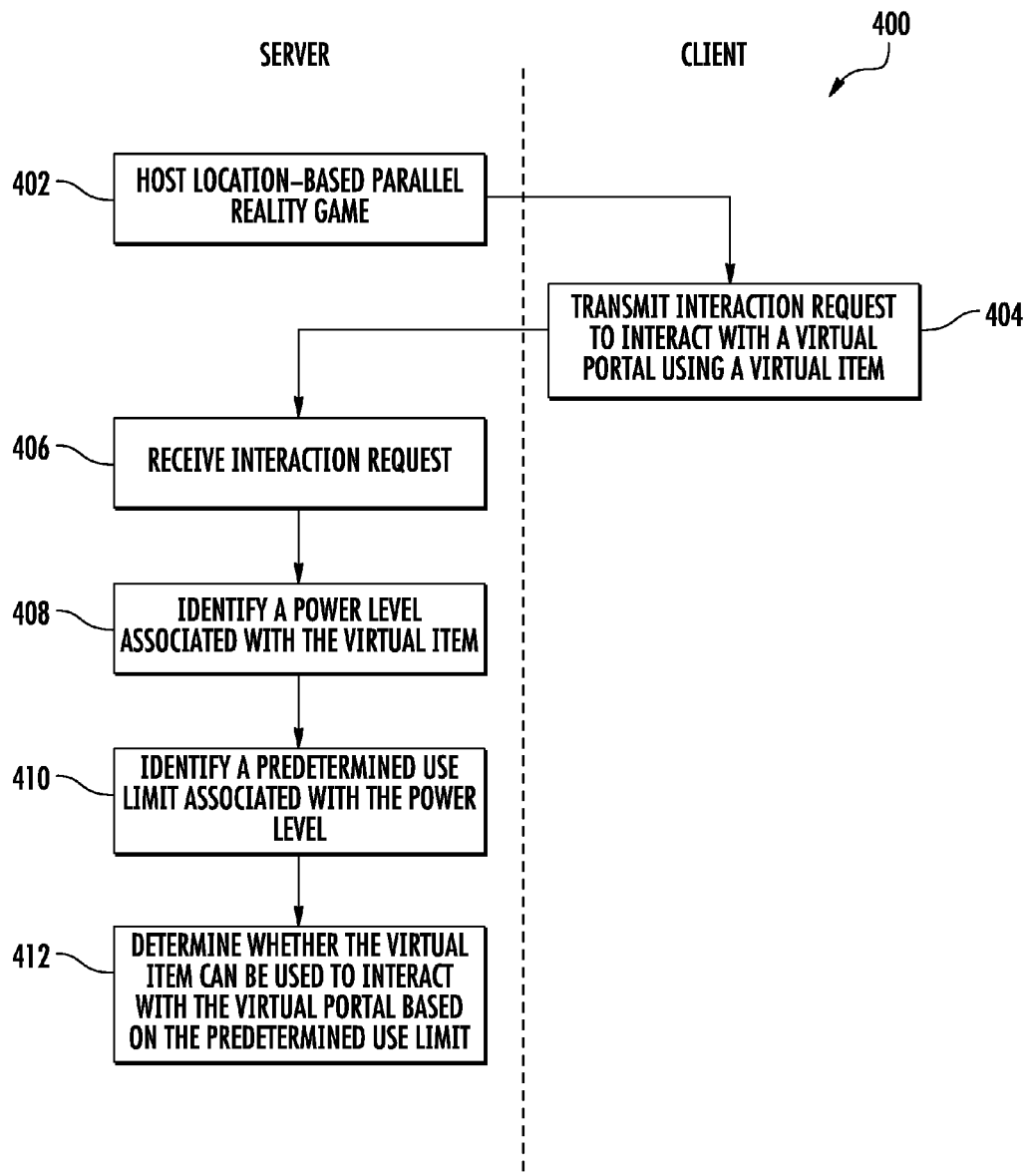
FIG. 4 illustrates a client-server flow diagram of one embodiment of a method for regulating player interactions within a location-based parallel reality game in accordance with aspects of the present subject matter.
Figure 5:
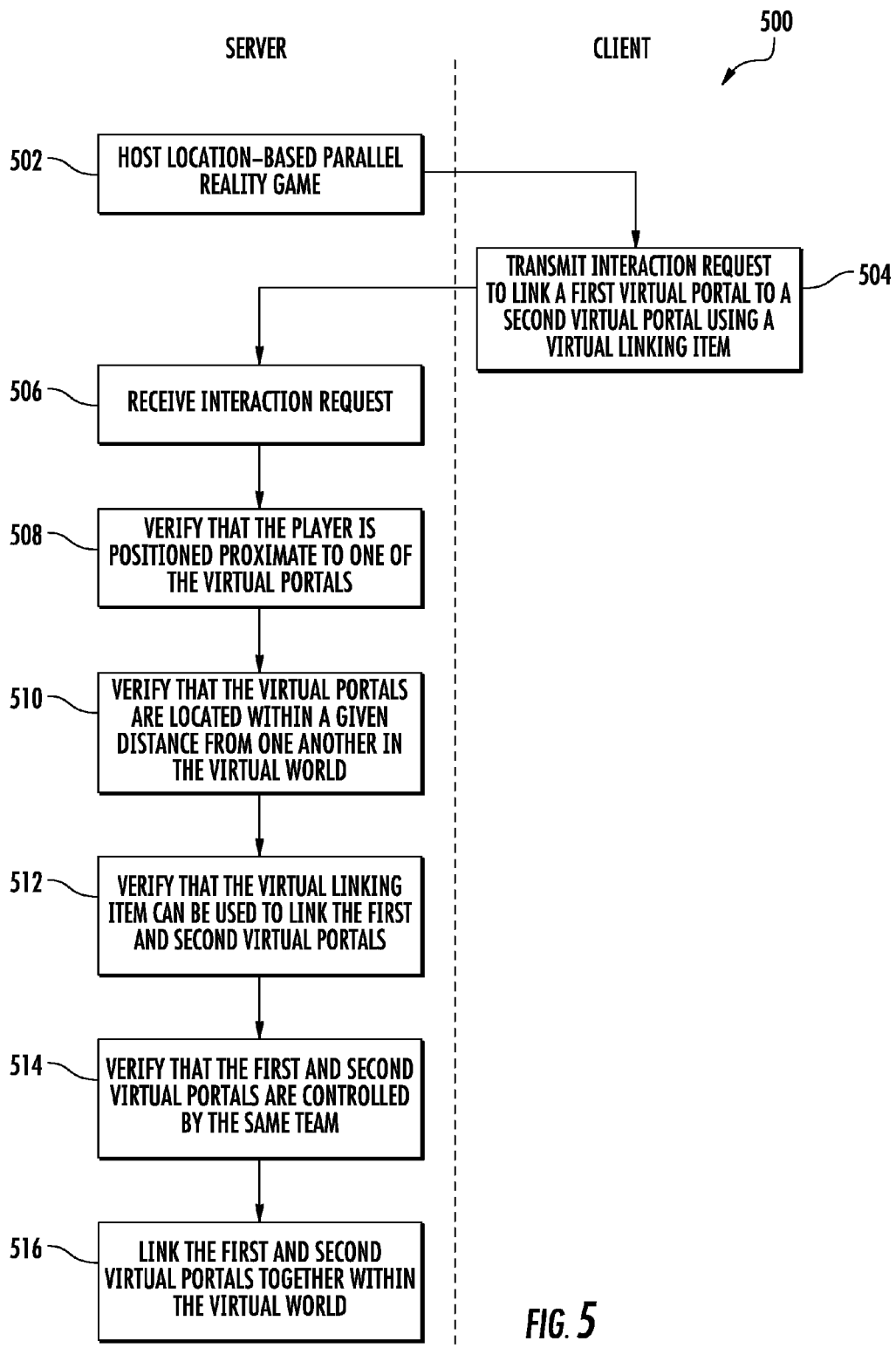
FIG. 5 illustrates a client-server flow diagram of another embodiment of a method for regulating player interactions within a location-based parallel reality game in accordance with aspects of the present subject matter.

Embodiments for Regulating Player Interactions within the Virtual World Associated with a Location-Based Parallel Reality Game FIGS. 4 and 5 illustrate client-server flow diagrams of embodiments of methods 400, 500 for regulating player interactions within the virtual world of a location-based parallel reality game in accordance with aspects of the present subject matter. In general, it should be appreciated that the methods may be implemented using any suitable client-server architecture, such as the location-based gaming system 100 of FIG. 1. In addition, although FIGS. 4 and 5 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As indicated above, players of a location-based parallel reality game may be required to deploy or otherwise use one or more virtual elements (e.g., virtual items) to capture or claim ownership of one or more other virtual elements (e.g., virtual portals) located within the virtual world. In accordance with several aspects of the present subject matter, each player may be limited in the amount of virtual items that can be used to capture a virtual portal within the virtual world depending on the power level(s) associated with the item(s) being deployed. For instance, an individual player may be capable of capturing a virtual portal by deploying a plurality of low level virtual items proximal to the location of the portal. However, when deploying higher level virtual items, each player may only be allowed to deploy a portion of the virtual items needed to actually capture a given virtual portal. In this regard, FIG. 4 illustrates one embodiment of a method 400 for regulating player interactions in relation to each player's ability to contribute to capturing or otherwise claiming ownership of virtual portals located within the virtual world.

As shown in FIG. 4, at (402), the method 400 includes hosting, with a server, the location-based parallel reality game for a plurality of client devices. For instance, referring to the system 100 described above with reference to FIG. 1, the game server 110 may host the parallel reality game for a plurality of client devices 120 over the network 130. Players may then access the game by communicating with the game server 110 over the network 130 via their client devices 120.

At (404), the method 400 includes transmitting an interaction request associated with using a virtual item to interact with a virtual portal located within the virtual world. For instance, a player may have one or more virtual items in his/her inventory (e.g., one or more virtual resonators) that are capable of being deployed in an attempt to capture or otherwise claim ownership of a virtual portal. In such instance, when the player's location in the real-world is in close proximity to the location of the virtual portal within the virtual world, the player may transmit an interaction request (via his/her client device 120) to the game server 110 in order to deploy a virtual item at the virtual portal.

It should be appreciated that, by deploying a given number of virtual items proximal to a virtual portal, the portal may be captured for a specific team or faction within the game. For instance, for purposes of the description herein, it will be assumed that eight virtual items are required to be deployed at and/or adjacent to a virtual portal to permit the portal to be captured by a given team. However, in other embodiments, any other number of virtual items may be required to capture a virtual portal within the virtual world.

At (406) and (408), the method 400 includes receiving the interaction request at the server and identifying a power level associated with the virtual item sought to be deployed or otherwise used by the player. Specifically, as indicated above, each virtual item may have a power level associated therewith. Thus, in several embodiments, the game server 110 may be configured to identify the power level of the virtual item associated with the player's interaction request. For purposes of the discussion herein, each virtual item will be described as having one of eight power levels ranging from the lowest power level (Level 1) to the highest power level (Level 8). However, in other embodiments, any other number of power levels may be utilized to characterize each virtual item.

At (410), the method 400 includes identifying a predetermined use limit associated with the power level of the virtual item sought to be deployed by the player via the interaction request. In general, the predetermined use limit corresponds to the allowable number of virtual items that may be used by the player to interact with a given virtual portal at each power level. For example, an individual player may be allowed to deploy multiple lower level virtual items. However, as the power level is increased, each player may be allowed to deploy fewer virtual items in an attempt to capture each virtual portal. For instance, Table 1 provides an example of use limits for virtual items having power levels ranging from Level 1 to Level 8.

TABLE 1

Example of Predetermined Use Limits

| Power Level | Use Limit per Virtual Portal |
| --- | --- |
| Level 1 | 8 Virtual Items |
| Level 2 | 4 Virtual items |
| Level 3 | 4 Virtual items |
| Level 4 | 4 Virtual items |
| Level 5 | 2 Virtual items |
| Level 6 | 2 Virtual items |
| Level 7 | 1 Virtual item |
| Level 8 | 1 Virtual Item |

As shown above, a single player may utilize eight Level 1 items to capture a given virtual portal, with the resulting captured portal having a relatively low power level due to the use of the low level virtual items. However, for higher level virtual items, a single player may be restricted in the number of items that can be deployed per virtual portal. For instance, as shown in the table, a single player may be allowed to deploy four Level 2-Level 4 items per virtual portal, two Level 5 and Level 6 items per virtual portal and one Level 7 and Level 8 item per virtual portal. Thus, for the example use limits shown in Table 1, the highest level (i.e., most powerful) virtual portal that a single player could capture on his/her own would require that the player deploy one Level 8 item, one Level 7 item, two Level 6 items, two Level 5 items and four Level 4 items at the virtual portal. However, by cooperating with other players, higher level virtual portals may be claimed for a given team or faction. For instance, with two players working together (e.g., player A and player B), a much higher level virtual portal may be captured by deploying two Level 8 items (one from player A and one from player B), two Level 7 items (one from player A and one from player B) and four Level 6 items (two from player A and two from player B). Similarly, with eight players collaborating together, an even higher level virtual portal may be captured by each player deploying one Level 8 item at and/or adjacent to the portal. Accordingly, the predetermined use limits may be utilized to allow individual players to enjoy a rich game experience while providing a clear incentive for collaborative play between players of the same faction or team.

Referring still to FIG. 4, at (412), the method 400 includes determining whether the virtual item associated with the player's interaction request can be used to interact with the virtual portal based on the predetermined use limits. Specifically, given the power level of the virtual item sought to be deployed by the player, it may be determined whether the use of such virtual item in connection with the virtual portal would exceed the use limit associated with the power limit. For instance, referring to the use limits provided above in Table 1, if a player had previously deployed two Level 6 items at a given virtual portal, the player would not be allowed to deploy another Level 6 item at the portal. In such instance, the player's interaction request to deploy a Level 6 item would be denied. However, if the player had previously deployed less than two Level 6 items at the virtual portal, the interaction request would be accepted and the player would be allowed to deploy the additional Level 6 item at the portal.

In addition to capturing individual virtual portals, players may also be allowed to link captured portals together within the virtual world. By linking three or more captured portals together, a captured region may be defined within the virtual world that is controlled or owned by the team or faction claiming ownership to the linked portals. In this regard, FIG. 5 illustrates one embodiment of a method 500 for regulating player interactions in relation to linking virtual portals together within the virtual world.

As shown in FIG. 5, at (502), the method 500 includes hosting, with a server, the location-based parallel reality game for a plurality of client devices. For instance, as indicated above, the game server 110 may host the parallel reality game for a plurality of client devices 120 over the network 130. Players may then access the game by communicating with the game server 110 over the network 130 via their client devices 120.

At (504), the method 500 includes transmitting an interaction request associated with using a virtual linking item (e.g., a link key) to link a first virtual portal located within the virtual world to a second virtual portal located within the virtual world. For instance, a player may desire to link three or more virtual portals together within the virtual world to create a captured region for his team or faction. In such instance, the player may transmit interaction requests (via his/her client device 120) to the game server 110 in order to link pairs of virtual portals together in order to define the captured region.

It should be appreciated that, in several embodiments, players may obtain virtual linking items by completing game objectives within the game, such as by capturing or hacking portals. Alternatively, virtual linking items may be obtained by players in any other suitable manner, such as by collecting the linking items by navigating through the virtual world or by purchasing the linking items using virtual currency.

Figure 6:
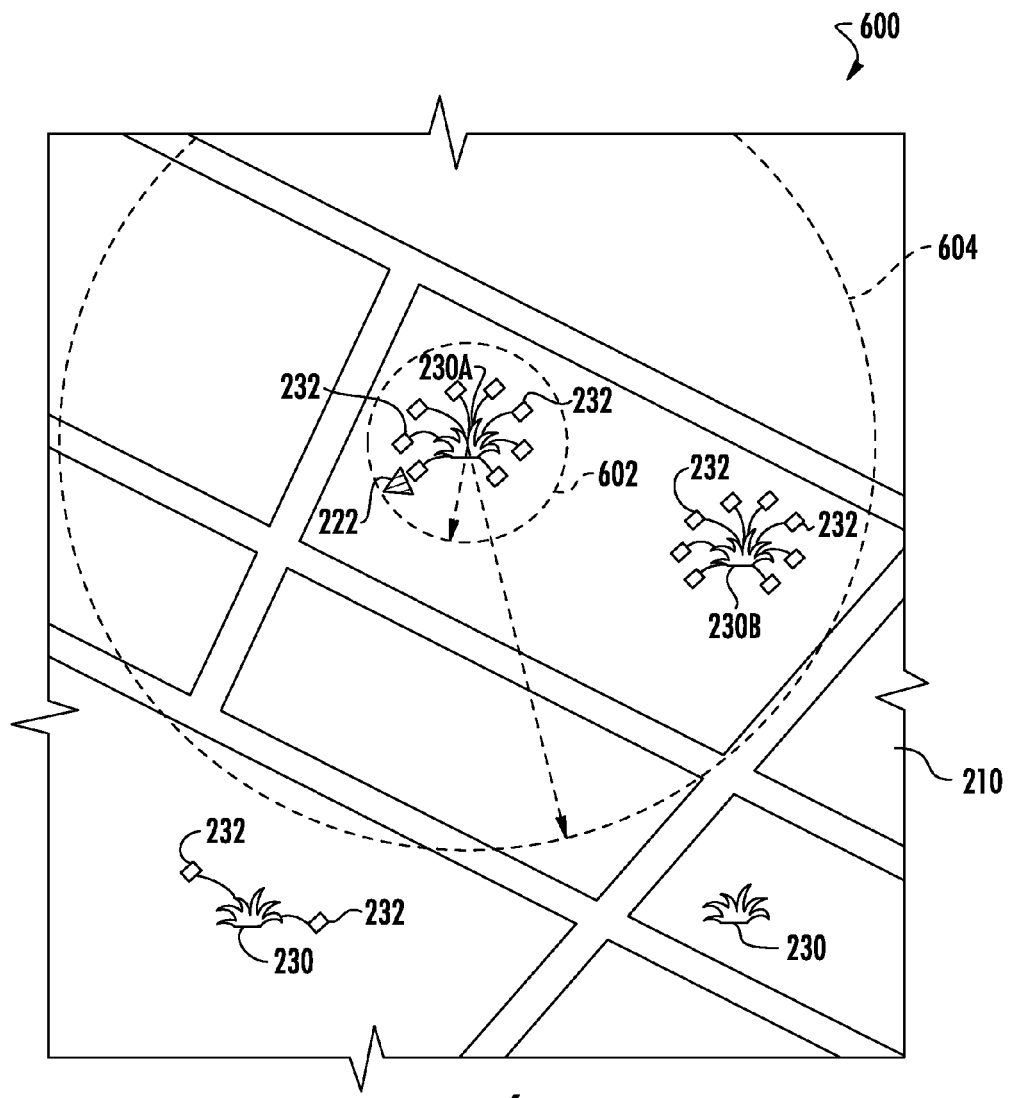
FIG. 6 illustrates a partial view of one embodiment of a game interface for a location-based parallel reality game in accordance with aspects of the present subject matter, particularly illustrating two captured virtual elements within the virtual world.

At (506), the method 500 includes receiving, at the server 110, the interaction request transmitted from the client device 120. Thereafter, the game server 110 may be configured to verify that several predetermined conditions for linking the first and second virtual portals are satisfied. For instance, at (508), the method 500 includes verifying that the player location within the virtual world is proximal to the location of one of the virtual portals to be linked. For example, FIG. 6 illustrates a partial view of an example game interface displaying a first captured virtual portal 230A and a second captured virtual portal 230B. Assuming that the player's interaction request is associated with linking the first captured portal 230A to the second captured portal 230B, the game server 110 may be configured to verify that the player's location within the virtual world 210 is proximate to the first or second portal 230A, 230B. As shown in FIG. 6, the player 222 is located proximate to the first captured portal 230A, which may be verified, for example, by determining whether the player 222 is located within an interaction range 602 associated with the first portal 230A.

Additionally, at (510), the method 500 includes verifying that the virtual portals to be linked are located within a given distance from one another in the virtual world. For instance, as shown in FIG. 6, a linking range 604 may be defined around the virtual portal located proximate to the player (e.g., the first captured portal 230A). In such instance, any virtual portals located within the linking range 602 may be allowed to be linked to the first portal 230A (assuming all other conditions necessary for linking are satisfied). It should be appreciated that, in several embodiments, the interaction range 602 for a given virtual portal may be different than the linking range 604 associated with such portal (e.g., by being shorter than the linking range 604). However, in other embodiments, the interaction and linking ranges 602, 604 may correspond to the same range or distance.

At (512), the method 500 includes verifying that the virtual linking item associated with the player's interaction request can be used to link the first and second virtual elements. Specifically, in several embodiments, the game server 110 may be configured to verify that virtual linking item is associated with linking the virtual portal located at the far end of the link being created. For instance, in the example of FIG. 6 in which the player is located proximate to the first captured portal 230A, it may be necessary that the virtual linking item being used is associated with linking the second captured portal 230B to other virtual portals. However, in other embodiments, the virtual linking item may be associated with the virtual portal located at the proximal end of the link being created (e.g., by being associated with the first captured portal 230A) or the virtual linking item may be a generic linking item that can be used to link any two portals within the virtual world.

At (514), the method 500 includes verifying that the first and second virtual portals are controlled by a team associated with the player who submitted the interaction request. Specifically, in several embodiments, virtual portals may only be linked when each virtual portal is controlled by the same team (e.g., by one or more players of the same team capturing the virtual portals in accordance with the method 400 described above with reference to FIG. 4). Thus, referring to FIG. 6, if both the first and second captured portals 230A, 230B are controlled by the same team, a member such team may submit an interaction request to link the two portals together within the virtual world 210.

It should be appreciated that the various linking conditions described above (e.g., conditions 508-514) are simply provided as one example of a suitable combination of conditions that must be satisfied for linking portals together within the virtual world. Such linking conditions may instead be implemented individually or any other suitable combination. In addition, any other suitable linking condition may be implemented to regulate the linking of portals within the virtual world. Regardless, once the relevant linking conditions are satisfied, at (516) the virtual portals associated with the player's interaction request may be linked together within the virtual world.

Figure 7:
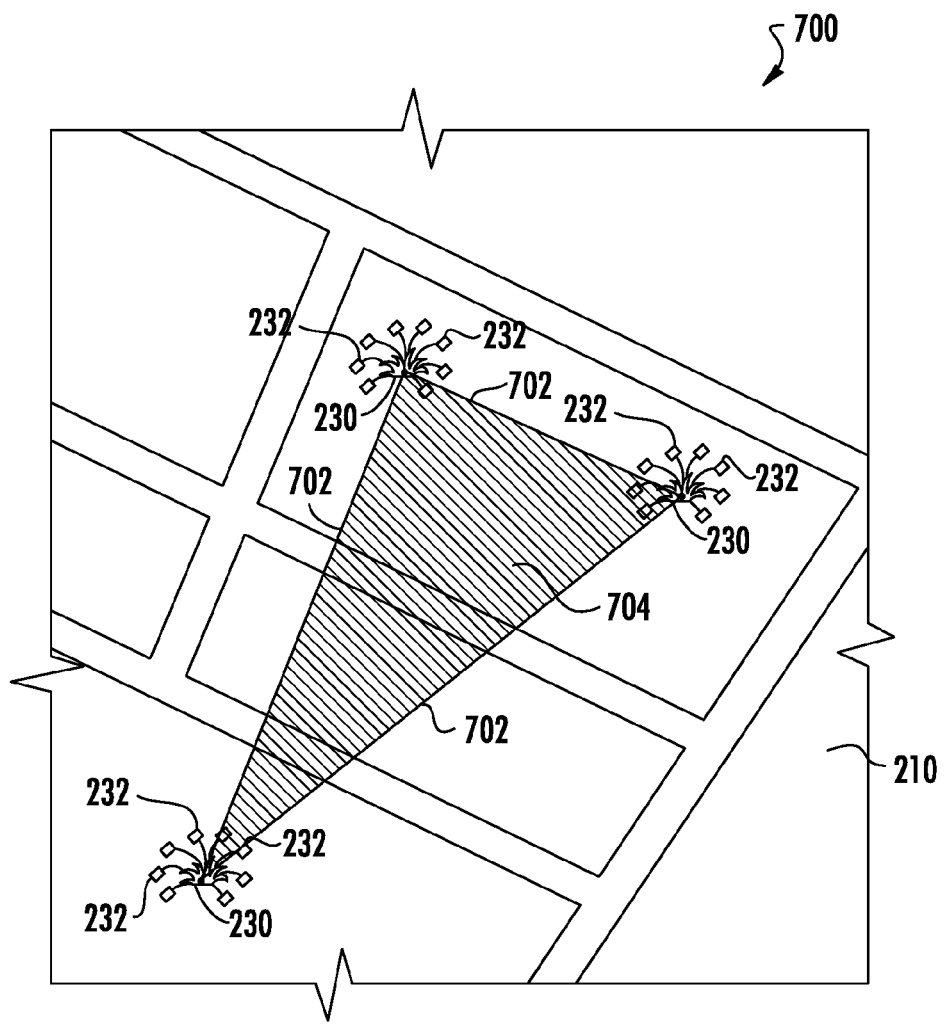
FIG. 7 illustrates another partial view of one embodiment of a game interface for a location-based parallel reality game in accordance with aspects of the present subject matter, particularly illustrating three linked virtual elements within the virtual world.

As indicated above, by linking multiple pairs of virtual portals together, captured regions may be created within the virtual world that are owned or controlled by the same team or faction that owns or controls the linked portals. Specifically, in several embodiments, a line segment may be used to link each pair of virtual portals. Thus, by linking three or more pairs of virtual portals together, a polygon corresponding to the captured region may be defined by the line segments extending between the linked portals, with each line segment defining one side of the captured region. For instance, FIG. 7 illustrates an example view of a game interface 700 in which three virtual portals 230 have been linked together by line segments 702 to define a closed shape (e.g., a triangular shape). In such instance, the closed shape defined within the virtual world 210 may correspond to the captured region (shown as the cross-hatched area 704). It should be appreciated that, although the captured region 704 is shown in FIG. 7 as being represented by a triangle, captured regions within the virtual world may generally be represented by any suitable polygons. For instance, if four virtual portals are linked together, the captured region may be represented by a rectangle, parallelogram or any other suitable four sided polygon (e.g., similar the captured region 904 shown in FIG. 9).

Figure 8:
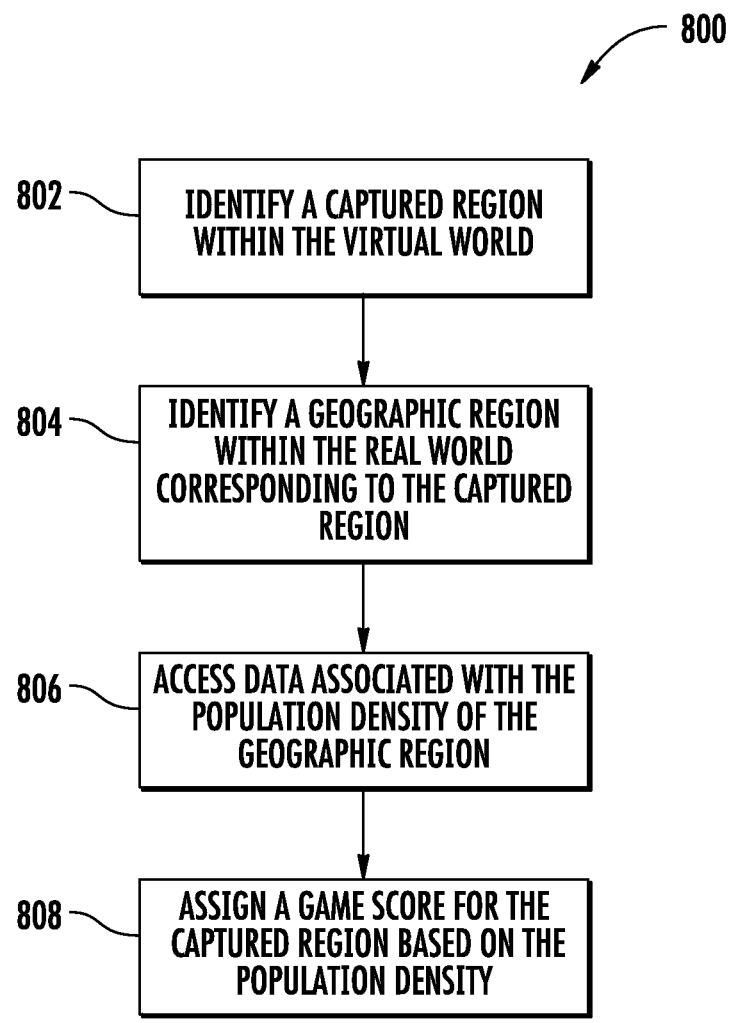
FIG. 8 illustrates a client-server flow diagram of one embodiment of a method for scoring player interactions within a location-based parallel reality game in accordance with aspects of the present subject matter.

Embodiments for Scoring Player Interactions within the Virtual World Associated with a Location-Based Parallel Reality Game FIG. 8 illustrates a flow diagram of one embodiment of a method 800 for scoring player interactions within the virtual world associated with a location-based parallel reality game in accordance with aspects of the present subject matter. In general, it should be appreciated that the method may be implemented using any suitable computing architecture, such as the location-based gaming system 100 of FIG. 1. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 9:
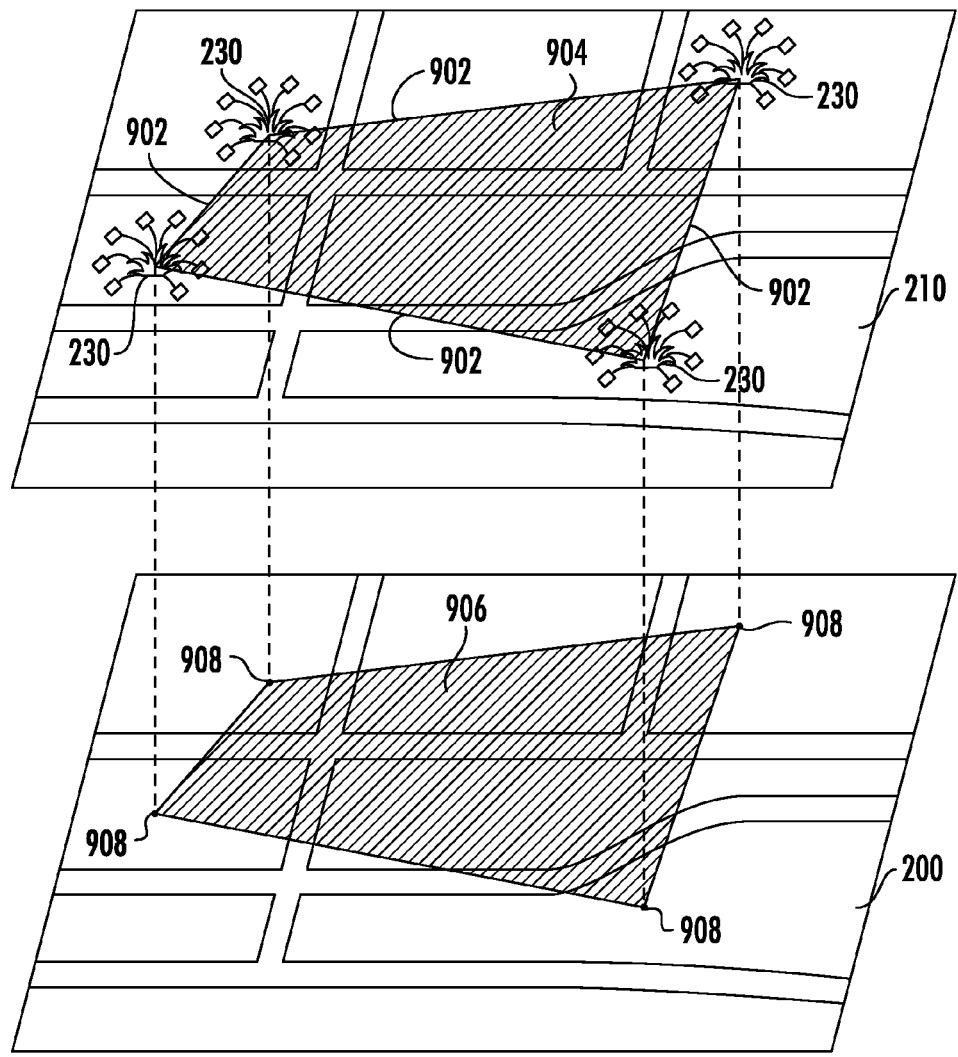
FIG. 9 illustrates an example representation of a virtual world having a geography that parallels the real world, particularly illustrating a captured region within the virtual world and its corresponding geographic region within the real world.

As shown in FIG. 8, at (802), the method 800 includes identifying a captured region within the virtual world that is associated with a team (or faction) of the location-based parallel reality game. Specifically, as indicated above, one or more members of a team may capture virtual portals, which can be subsequently linked together to form a captured region that is owned or controlled by such team. For instance, FIG. 9 illustrates an example representation of a portion of a virtual world 210 having a geography that parallels the geography of the real world 200. As shown, virtual portals 230 captured by members of a team have been linked together within the virtual world 210 (via line segments 902). In such instance, the game server 110 may be configured to identify the area bounded by the line segments 902 as a captured region (indicated by cross-hatched area 904) controlled or owned by the team.

At (804), the method 800 includes identifying a geographic region within the real world that corresponds to the captured region within the virtual world. As indicated above, the game includes a range of coordinates defining a virtual space in the virtual world that corresponds to a range of coordinates defining a geographic area or space in the real world. Thus, by identifying the virtual space associated with the captured region defined within the virtual world, a corresponding geographic region may be identified within the real world. For instance, as shown in FIG. 9, the virtual space encompassed by the captured region 904 may be mapped to a corresponding geographic region (indicated by cross-hatched area 906) within the real world 200 (e.g., by mapping the location of the linked virtual portals 230 within the virtual world 210 to corresponding points 808 located within the real world 200).

At (806), the method 800 includes accessing data associated with the population density of at least a portion of the area encompassed by the geographic region (e.g., region 906 of FIG. 9). Specifically, in several embodiments, population density data may be stored within a database of the game server 110 (e.g., game database 115) for each geographic region within which the game is being played. The server 110 may then access the database to identify the population density data associated with the geographic region within the real world corresponding to the captured region within the virtual world.

Figure 10:
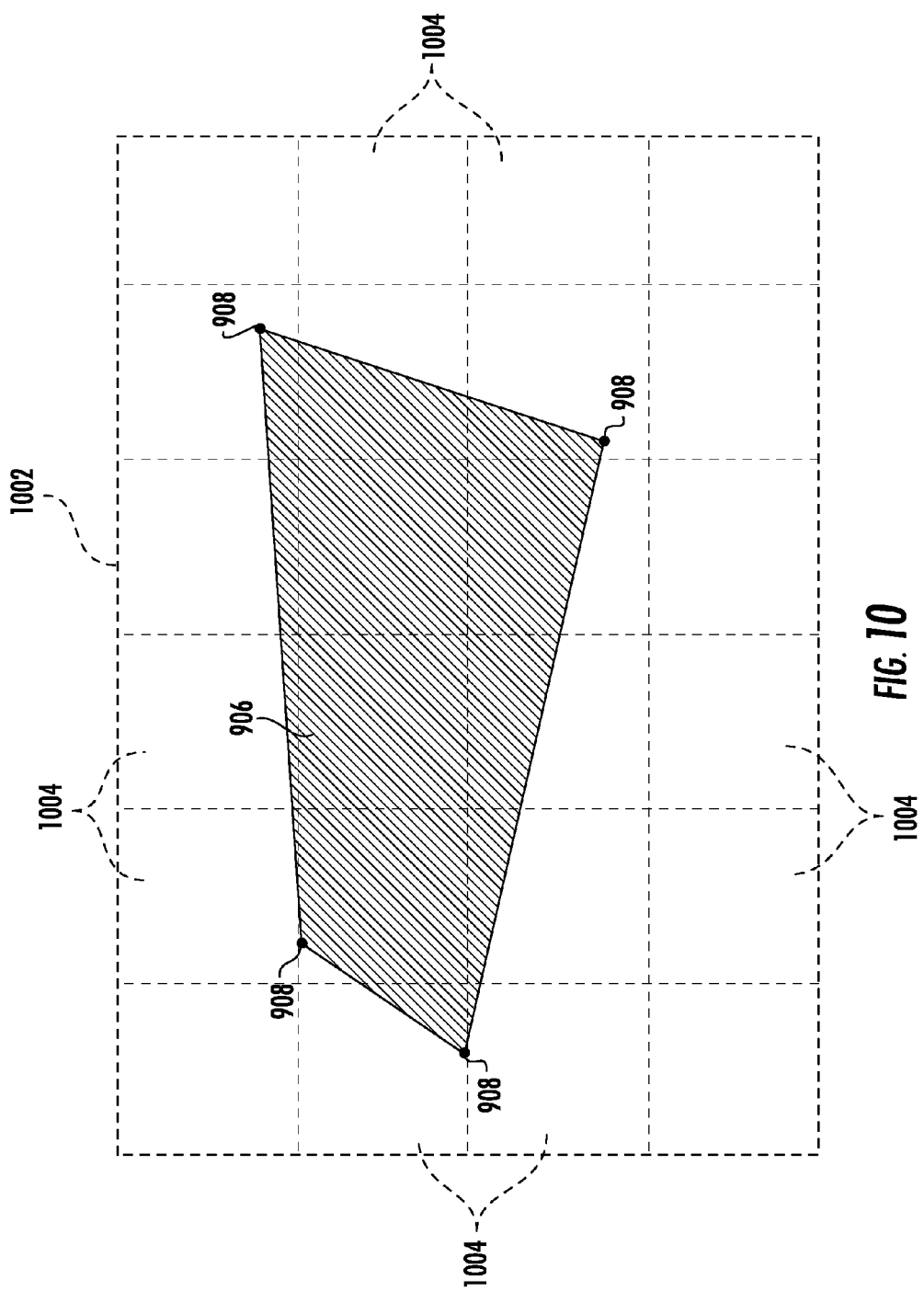
FIG. 10 illustrates a close-up view of the geographic region shown in FIG. 9.

At (808), the method 800 includes assigning a game score for the captured region based on the population density associated with the geographic region. Specifically, in several embodiments, the game score assigned to each captured region may be determined by multiplying the overall area of the geographic region by the population density associated with such region. In doing so, the manner in which the score is calculated may depend on the granularity of the population density data. For instance, FIG. 10 illustrates a blown-up view of the geographic region 906 shown in FIG. 9. If the data being used to assign the game score is based upon the population density across an area that completely encompasses the geographic region 906 (e.g., large box 1002 in FIG. 10), the score assigned to the corresponding captured region (e.g., region 904 in FIG. 9) may simply be the population density for such area multiplied by the total area of the geographic region 906. However, if the data is based upon population densities of multiple areas that overlap the geographic region 906 (e.g., small boxes 1004 in FIG. 10), the score assigned to the corresponding captured region may be determined by multiplying the total area of the geographic region 906 contained within each area (i.e., within each individual box 1004) by the population density for such area in order to obtain an individual score for each area. The individual scores for each area across which the geographic region 906 overlaps may then be aggregated to determine the total score assigned to the captured region 904.

As indicated above, individual game scores for captured regions controlled by a given team may be aggregated to determine the team's total game score. Such aggregated team scores may then be published (e.g., within a leaderboard) to allow access to team standings within the game.

It should be appreciated that, although the disclosed methods 400, 500, 800 have been described herein with reference to interacting with virtual portals, the various methods may be used to regulate and/or score player interactions with any suitable virtual elements contained within the virtual world of a location-based parallel reality game. The virtual portals are simply described as one example of a virtual element.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for scoring player interactions within a location-based parallel reality game, the method comprising:
    receiving, by a computer system from a mobile device of a player, a request to link a plurality of portals captured by a team in a virtual world of a parallel reality game that parallels at least a portion of a real world, the player a member of the team;
    receiving, by the computer system from the mobile device, a location of the player in the real world, the location of the player in the real world determined by a positioning device included with the mobile device;
    mapping, by the computer system, the location of the player in the real world to a location in the virtual world;
    determining, by the computer system, whether the location in the virtual world is within an interaction range of at least one portal from the plurality of portals in the virtual world;
    responsive to determining that the location in the virtual world is within the interaction range of the at least one portal, linking, by the computer system, the plurality of virtual portals to generate a captured region within the virtual world;
    identifying, by the computer system, a geographic region within the real world corresponding to the captured region within the virtual world; and
    assigning, by the computer system, a score to the team for the captured region based on a population density of the geographic region.

2. The computer-implemented method of claim 1, wherein the captured region corresponds to a polygon defined by lines extending between virtual elements within the virtual world.

3. The computer-implemented method of claim 2, wherein the virtual elements of the virtual world are verified to be controlled by the team prior to the team capturing the captured region.

4. The computer-implemented method of claim 1, wherein the captured region comprises a first plurality of coordinates defining a virtual space within the virtual world, wherein identifying the geographic region comprises identifying a second plurality of coordinates within the real world corresponding to the first plurality of coordinates.

5. The computer-implemented method of claim 1, wherein assigning a score to the team comprises multiplying the population density of the geographic region by an area of the geographic region.

6. The computer-implemented method of claim 1, further comprising determining a team score for the team by aggregating scores for each captured region associated with the team.

7. The computer-implemented method of claim 1, wherein the virtual world includes a first plurality of coordinates defining a virtual space within the virtual world corresponding to a second plurality of coordinates defining the geographic region within the real world, a location of the player within the virtual space being varied as the player moves around the geographic region within the real world.

8. A non-transitory computer-readable storage medium having computer-executable instructions for scoring player interactions within a location-based parallel reality game, the computer-executable instructions, when executed by one or more processors, cause the one or more processors to perform steps comprising:

receiving, by a computer system from a mobile device of a player, a request to link a plurality of portals captured by a team in a virtual world of a parallel reality game that parallels at least a portion of a real world, the player a member of the team;

receiving, by the computer system from the mobile device, a location of the player in the real world, the location of the player in the real world determined by a positioning device included with the mobile device;

mapping, by the computer system, the location of the player in the real world to a location in the virtual world;

determining, by the computer system, whether the location in the virtual world is within an interaction range of at least one portal from the plurality of portals in the virtual world;

responsive to determining that the location in the virtual world is within the interaction range of the at least one portal, linking, by the computer system, the plurality of virtual portals to generate a captured region within the virtual world;

identifying, by the computer system, a geographic region within the real world corresponding to the captured region within the virtual world; and assigning, by the computer system, a score to the team for the captured region based on a population density of the geographic region.

9. The non-transitory computer-readable storage medium of claim 8, wherein the captured region corresponds to a polygon defined by lines extending between virtual elements within the virtual world.

10. The non-transitory computer-readable storage medium of claim 9, wherein the virtual elements of the virtual world are verified to be controlled by the team prior to the team capturing the captured region.

11. The non-transitory computer-readable storage medium of claim 8, wherein the captured region comprises a first plurality of coordinates defining a virtual space within the virtual world, wherein identifying the geographic region comprises identifying a second plurality of coordinates within the real world corresponding to the first plurality of coordinates.

12. The non-transitory computer-readable storage medium of claim 8, wherein assigning a score to the team comprises multiplying the population density of the geographic region by an area of the geographic region.

13. The non-transitory computer-readable storage medium of claim 8, further comprising determining a team score for the team by aggregating scores for each captured region associated with the team.

14. The non-transitory computer-readable storage medium of claim 8, wherein the virtual world includes a first plurality of coordinates defining a virtual space within the virtual world corresponding to a second plurality of coordinates defining the geographic region within the real world, a location of the player within the virtual space being varied as the player moves around the geographic region within the real world.

15. A computer system for scoring player interactions within a location-based parallel reality game, the system comprising:

one or more computer processors; and a non-transitory computer-readable storage medium storing computer-executable instruction which when executed by the one or more computer processors cause the one or more computer processors to perform steps comprising:

receiving, from a mobile device of a player, a request to link a plurality of portals captured by a team in a virtual world of a parallel reality game that parallels at least a portion of a real world, the player a member of the team;

receiving, from the mobile device, a location of the player in the real world, the location of the player in the real world determined by a positioning device included with the mobile device;

mapping the location of the player in the real world to a location in the virtual world;

determining whether the location in the virtual world is within an interaction range of at least one portal from the plurality of portals in the virtual world;

responsive to determining that the location in the virtual world is within the interaction range of the at least one portal, linking the plurality of virtual portals to generate a captured region within the virtual world;

identifying a geographic region within the real world corresponding to the captured region within the virtual world; and assigning a score to the team for the captured region based on a population density of the geographic region.

16. The system of claim 15, wherein the captured region corresponds to a polygon defined by lines extending between virtual elements within the virtual world.

17. The system of claim 15, wherein the captured region comprises a first plurality of coordinates defining a virtual space within the virtual world, wherein identifying the geographic region comprises identifying a second plurality of coordinates within the real world corresponding to the first plurality of coordinates.

18. The system of claim 15, wherein assigning a score to the team comprises multiplying the population density of the geographic region by an area of the geographic region.

19. The system of claim 15, further comprising determining a team score for the team by aggregating scores for each captured region associated with the team.

20. The system of claim 15, wherein the virtual world includes a first plurality of coordinates defining a virtual space within the virtual world corresponding to a second plurality of coordinates defining the geographic region within the real world, a location of the player within the virtual space being varied as the player moves around the geographic region within the real world.

* * * * *